United States Patent
Lindström

(10) Patent No.: US 10,796,858 B2
(45) Date of Patent: Oct. 6, 2020

(54) SOLAR CELL COMPRISING GRAINS OF A DOPED SEMICONDUCTING MATERIAL AND A METHOD FOR MANUFACTURING THE SOLAR CELL

(71) Applicant: Exeger Operations AB, Stockholm (SE)

(72) Inventor: Henrik Lindström, Åkersberga (SE)

(73) Assignee: Exeger Operations AB, Stockholm (SE)

( * ) Notice: Subject to any disclaimer, the term of this patent is extended or adjusted under 35 U.S.C. 154(b) by 0 days.

(21) Appl. No.: 16/082,606

(22) PCT Filed: Mar. 1, 2017

(86) PCT No.: PCT/SE2017/050193
§ 371 (c)(1),
(2) Date: Sep. 6, 2018

(87) PCT Pub. No.: WO2017/155447
PCT Pub. Date: Sep. 14, 2017

(65) Prior Publication Data
US 2019/0080852 A1    Mar. 14, 2019

(30) Foreign Application Priority Data
Mar. 10, 2016   (SE) ...................... 1650331

(51) Int. Cl.
*H01G 9/20*       (2006.01)

(52) U.S. Cl.
CPC ......... *H01G 9/2013* (2013.01); *H01G 9/2031* (2013.01); *H01G 9/2059* (2013.01); *Y02E 10/542* (2013.01); *Y02P 70/521* (2015.11)

(58) Field of Classification Search
CPC ... H01G 9/2031; H01G 9/2059; H01G 9/2013
See application file for complete search history.

(56) References Cited

U.S. PATENT DOCUMENTS 4,357,400 A   11/1982  Appleby
4,628,013 A   12/1986  Figard et al.
(Continued)

FOREIGN PATENT DOCUMENTS

EP    1624472 A2   2/2006
EP    2224534 A1   9/2010
(Continued)

OTHER PUBLICATIONS

Lee et al., "Quantum-Dot-Sensitized Solar Cell with Unprecedentedly High Photocurrent," Scientific Reports, vol. 3, Jan. 10, 2013, pp. 1-8.
(Continued)

*Primary Examiner* — Golam Mowla
(74) *Attorney, Agent, or Firm* — Dilworth & Barrese, LLP

(57) ABSTRACT

The present invention relates to a solar cell and a method for manufacturing thereof. The solar cell comprises a porous insulating substrate (2), a first porous conducting layer (4) and a second porous conducting layer (6) disposed on opposite sides of the porous insulating substrate, a light absorbing layer (8) in electrical contact with the first conducting layer, and an electrolyte integrally positioned through the porous conducting layers, the porous insulating substrate and the light absorbing layer to transfer charge carriers between the second conducting layer and the light absorbing layer. The light absorbing layer (8) comprises a plurality of grains (10) of a doped semiconducting material.

17 Claims, 2 Drawing Sheets

(56) References Cited

U.S. PATENT DOCUMENTS

| | | | |
|---|---|---|---|
| 6,069,313 A | 5/2000 | Kay | |
| 6,653,701 B1* | 11/2003 | Yamazaki | H01G 9/2031 |
| | | | 136/248 |
| 7,271,334 B2* | 9/2007 | Gratzel | B01J 35/002 |
| | | | 136/263 |
| 2002/0040728 A1* | 4/2002 | Yoshikawa | H01G 9/2009 |
| | | | 136/263 |
| 2003/0121543 A1* | 7/2003 | Gratzel | H01G 9/2027 |
| | | | 136/252 |
| 2006/0021649 A1 | 2/2006 | Kuroda et al. | |
| 2007/0238216 A1* | 10/2007 | Park | H01L 31/0284 |
| | | | 438/57 |
| 2011/0023932 A1 | 2/2011 | Fukui et al. | |
| 2012/0008253 A1 | 1/2012 | Kuroda et al. | |
| 2014/0251428 A1* | 9/2014 | Lindstrom | H01G 9/2022 |
| | | | 136/256 |
| 2015/0083182 A1* | 3/2015 | Lindstrom | H01G 9/2027 |
| | | | 136/244 |

FOREIGN PATENT DOCUMENTS

| | | | |
|---|---|---|---|
| WO | 97/16838 A1 | 5/1997 | |
| WO | 2013/149787 A1 | 10/2013 | |
| WO | WO 2013/149787 A1 * | 10/2013 | H01G 9/2059 |
| WO | 2013/171520 A1 | 11/2013 | |
| WO | 2014/184379 A1 | 11/2014 | |

OTHER PUBLICATIONS

Zhang et al., "N-doped carbon quantum dots for Ti02-based photocatalysts and dye-sensitized solar cells," Nano Energy, vol. 2, Jul. 31, 2013, pp. 545-552.

\* cited by examiner

SOLAR CELL COMPRISING GRAINS OF A DOPED SEMICONDUCTING MATERIAL AND A METHOD FOR MANUFACTURING THE SOLAR CELL

FIELD OF THE INVENTION

The present invention relates to a solar cell, which directly converts sunlight into electricity, and a method for producing the same.

BACKGROUND OF THE INVENTION

A solar cell is a device which directly converts sunlight into electricity. Light incident on the surface of the solar cell produces electric power. A solar cell has a light absorbing layer. When the energy of a photon is equal to or greater than the band gap of the material in a light absorbing layer, the photon is absorbed by the material and a photo-exited electron is generated. Silicon is the most commonly used semiconductor material in solar cells. Standard silicon solar cells are made from thin wafers of doped silicon. The front surface is doped in another way than the base, creating a PN-junction. Under illumination, photons are absorbed creating an electron-hole pair that is separated in the PN-junction. On the backside of the solar cell, a metal plate collects excess charge-carriers from the base and on the front side, metal wires collects excess charge-carriers from the emitter. Thus, conventional silicon solar cells have a front-side contacted emitter. There is a trade-off between good current collecting and light harvesting using current collecting wires on the front side. By increasing the size of the metal wires, the conduction is increased and the current collection is improved. However, by increasing the size of the metal wires, more of the sun harvesting area is shaded leading to a reduced efficiency of the solar cell.

A known solution to this problem is rear contact solar cells. Rear contact solar cells achieve higher efficiency by moving the front-side contacted emitter to the rear side of the solar cell.

U.S. Pat. No. 4,357,400 discloses a rear contact solar cell with doped silicon particles in redox electrolyte. The solar cell includes an insulating substrate having two conductive layers interleaved on one side of the substrate. Discrete semiconductor particles of one conductivity type are positioned on one of the conductive layers and semiconducting particles of opposite conductive type are positioned on the other conductive layer. All is immersed in a redox electrolyte and encapsulated. The redox electrolyte contacts the particles whereby a voltage potential is generated across the two conductive layers in response to photons impinging on the semiconductor particles. The semiconductor particles are preferably spherically shaped silicon bodies with a diameter of less than 100 microns. The particles are mono-doped or particles with an outer layer of one type of doping and an inner body of another type of doping. The conductive layers are thin layers of, for example, aluminum. The conductive layers are sputtered and etched on a substrate in a pattern, for example, with interdigitated fingers.

The semiconducting particles may be applied by silk screening and glued to the surface of the conductors. The semiconducting particles may also be covered by a thin metallic layer of copper or nickel and be fused or electroplated to the conductive layers.

A disadvantage with this solar cell is that the manufacturing process is complicated and time-consuming. Thus, the solar cell is expensive to manufacture.

WO 2013/149787 A1 discloses a dye-sensitized solar cell including a porous insulating layer, a working electrode including a porous conducting metal layer formed on top of the porous insulating layer, and a porous semiconductor layer containing an adsorbed dye arranged on top of the porous conducting metal layer to face the sun. The porous semiconductor layer comprises $TiO_2$ metal oxide particles dyed by light adsorbing dye molecules on the surface of the $TiO_2$ particles. The dye-sensitized solar cell further includes a counter electrode including a conducting layer disposed on an opposite side of the porous insulating layer. An electrolyte is filled in between the working electrode and the counter electrode. An advantage of this solar cell is that it is easy and fast to manufacture. Thus, the solar cell is cheap to manufacture. A disadvantage of this type of solar cell compared to a silicon solar cell is that its maximum efficiency is lower due to the fact that the dye molecules have less ability to absorb light than silicon.

In a further development of the dye-sensitized solar cells, the efficiency of the cells has been augmented by the use of perovskites as a substitute to the dye infused $TiO_2$ layer. In WO2014184379 a solar cell is described having a perovskite light absorbing layer disposed directly onto a porous conductive surface. The solar cell further comprises a second conductive layer and a third conductive network formed partly into the insulating layer between the conductive layers. Other solutions containing a perovskite light absorbing layer is described in WO2013171520, where a porous layer of perovskite is applied onto a compact $TiO_2$ layer and is infiltrated with a charge transporting material such as a liquid electrolyte. An FTO anode and a silver cathode placed on opposite sides of the light absorbing perovskite layer act as conductive layers. However, perovskite has several disadvantages, for example, it is expensive, instable and environmentally hazardous.

OBJECT AND SUMMARY OF THE INVENTION

It is an object of the present invention to at least partly overcome the above problems, and to provide an improved solar cell.

This object is achieved by a solar cell as defined herein;

The solar cell comprises a porous insulating substrate, a first porous conducting layer and a second porous conducting layer disposed on opposite sides of the porous insulating substrate, a light absorbing layer comprising a plurality of grains of a doped semiconducting material in electrical contact with the first conducting layer, an electrolyte integrally positioned through the porous conductive layers, the porous insulating substrate and the light absorbing layer to transfer charge carriers between the second conducting layer and the light absorbing layer.

The solar cell according to the invention is easy to manufacture and can be made of low cost materials. Accordingly, this solar cell is cheaper than the prior art solar cells. An environmentally friendly and stable material with high conversion efficiency, such as silicon, can be used as grains in the light absorbing layer. The solar cell according to the invention can be made thin and flexible.

The grains of the light absorbing layer have an upper portion facing the incident light and a lower portion. The grains shall be in electrical contact with the first porous conducting layer. The lower portion of the grains may be in physical contact with the first porous conducting layer and may be protruding into the first porous conducting layer.

It is desired to have a good electrical contact between the grains and the first porous conducting layer. The first and second conducting layers, and the insulating substrate have to be porous to enable ionic transport through conducting layers and the substrate by means of the electrolyte. However, due to the porosity of the first conducting layer, it can be difficult to bond the grains to the conducting layer and to provide sufficient electrical contact between the grains and the porous conducting layer.

According to an embodiment of the invention, the grains of the light absorbing layer have an upper portion facing incident light and a lower portion protruding into the first porous conducting layer. Due to the fact that lower portions of the grains are protruding into the porous conducting layer, the areas of the contact surfaces between the grains and the porous conducting layer are increased. By increasing the contact area, bonding between the grains and the porous conducting layer is facilitated. The increased contact area further leads to an improved electrical contact between the grains and the conducting layer. For example, the grains are bonded to the porous conducting layer by means of sintering.

According to an embodiment of the invention, a number of the grains of doped semiconducting material are in physical and electrical contact with the first conducting layer.

According to an embodiment of the invention, the grains are made of Si. Silicon is a suitable material to be used in solar cells since it is cheap, environmentally friendly, stable, and has a high ability to absorb light, which leads to a high efficiency of the light absorbing layer.

According to an embodiment of the invention, the first porous conductive layer comprises titanium (Ti) or a titanium alloy. Preferably, at least a main part of the first conducting layer is made of titanium or a titanium alloy. Suitably, the second porous conductive layer also comprises titanium or a titanium alloy. Preferably, at least a main part of the second conducting layer is made of titanium or a titanium alloy. Titanium is a suitable material to be used in the conducting layer due to its ability to withstand corrosion from the electrolyte.

According to an embodiment of the invention, the grains are made of silicon, the first conducting layer comprises titanium, and the boundaries between the grains and the first conducting layer comprises titanium silicide. With "the boundaries between the grains and the first conducting layer" is meant the zones of physical contact between grains and the conducting layer. Preferably, zones of physical contact between grains and the conducting layer consist of titanium silicide. Titanium silicide has good electrical conducting properties. Due to the fact that the boundaries between the grains and the first conducting layer comprises titanium silicide, the electrical contact between the grains and the conducting layer is further improved. Therefore the efficiency of the solar cell is increased. The titanium silicide is formed in the boundaries between the grains and the first conducting layer during manufacturing of the solar cell.

Titanium silicide can exist in several variations, for example, $TiSi_2$, $TiSi$, $TiSi_4$, $TiSi_3$, $Ti_3Si$.

According to an embodiment of the invention, the boundaries between the grains and the first conducting layer comprises $TiSi_2$. $TiSi_2$ exists in two variations C49-$TiSi_2$ and C54-$TiSi_2$.

According to an embodiment of the invention, the electrolyte is a liquid electrolyte.

According to an embodiment of the invention, the grains of doped semiconducting material are mono-doped. Suitably, the grains are made of mono-doped silicon. With a mono-doped grain is meant that the whole grain has the same type of doping. For example, a mono doped grain may be of either P-type or N-type, but not partly of N-type and partly of P-type. It is easy to produce mono-doped grains and the price is low.

According to an embodiment of the invention, the first porous conducting layer comprising conductive particles and the grains are bonded to the conductive particles. The conductive particles are in physical and electrical contact with each other. Suitably, the grains are made of silicon, the conductive particles comprises titanium, and the boundaries between the particles and the grains comprises titanium silicide. Thus, the electrical contact between the grains and the particles is improved.

According to an embodiment of the invention, at least a part of the surfaces of the conductive particles are covered with oxide. The parts of the surfaces of the conductive particles, which are not in contact with the grains, are covered with oxide. The oxide provides a protective and electrically insulating layer on the particle, which prevents that electrons or holes are transferred between the conducting layer and the electrolyte and thereby preventing short circuit between the conducting layer and the electrolyte.

According to an embodiment of the invention, at least a part of surfaces of the conductive particles are covered with TiO2. Suitably, the conductive particles comprises titanium, and the parts of the surfaces of the conductive particles, which are not in contact with the grains, are covered with titanium oxide. The titanium oxide provides a protective oxide layer on the titanium particles, which prevents short circuit between the conducting layer and the electrolyte.

Preferably, the semiconductor grains have a size less than 100 μm.

This object of the invention is also achieved by providing a method for producing the solar cell according to the invention, as defined herein.

The method comprises:
forming onto one side of a porous insulating substrate a first porous conducting layer,
forming onto an opposite side of the porous insulating substrate a second porous conducting layer,
coating the first porous conducting layer with a layer of grains made of a doped semiconducting material,
a first heat treatment of the solar cell in a non-oxidizing environment or vacuum to bond the grains to the first porous conducting layer, and
a second heat treatment of the solar cell in an oxidizing environment until the surfaces of the porous conducting layers have been oxidized.

The first heat treatment in a non-oxidizing environment causes bonding between the grains and the first porous conducting layer, and the second heat treatment causes formation of electrically insulating oxide layer on the surfaces of the porous conducting layers and thereby prevents short circuit between the electrolyte and the conducting layers. During the second heat treatment, the surfaces of the first porous conducting layer, which are not in contact with the grains, or in contact with the other particles in the in the conducting layer are oxidized.

The light absorbing layer can, for example, be manufactured by depositing an ink comprising doped grains on the surface of the first conducting layer. The ink can be deposited in any suitable pattern on the surface. The first porous conducting layer can, for example, be manufactured by depositing an ink comprising conducting particles on one side of the first porous conducting layer. The second porous conducting layer can, for example, be manufactured by depositing an ink comprising conducting particles onto an opposite side of the porous insulating substrate.

According to an embodiment of the invention, the first porous conducting layer comprises conductive particles, and the first heat treatment is carried out until the grains have been sintered to the particles of first porous conducting layer, and the second heat treatment is carried out until the parts of the surfaces of conductive particles, which parts are not in contact with the grains, or in contact with the other particles in the in the conducting layer, have been oxidized. Suitably, the conducting particles of the first conducting layer comprises titanium, and the second heat treatment causes formation of $TiO_2$.

According to an embodiment of the invention, the grains are made of silicon and the first conducting layer comprises titanium. The first heat treatment in a non-oxidizing environment or vacuum causes formation of titanium silicide in boundaries between the grains and the first conducting layer. The second heat treatment in an oxidizing environment causes formation of $TiO_2$ on the surfaces of the conductive particles of the porous conducting layers. The formation of titanium silicide between the grains and the particles of the first conducting layer improves the electrical contact between the silicon grains and the particles of the first conducting layer. The formation of $TiO_2$ on the conductive particles achieves an electrically insulating layer on the particles of first conducting layer, and thus prevents short circuit between the electrolyte and the conducting particles.

According to an embodiment of the invention, the solar cell is heat treated in vacuum with a temperature above 550° C. during at least two hours. The duration of the heat treatment depends on the temperature. The higher temperature, the shorter time.

According to an embodiment of the invention, the method comprises applying a pressure on the layer of grains so that portions of the grains project into the first porous conducting layer. This step should be carried out before the first and second heat treatment steps. By applying a pressure force on the layer of grains in a direction towards the first conducting layer, the grains are partly pushed into the first porous conducting layer and by that the contact areas between the grains and the particles are increased, which makes it easier to bond the grains to the porous conducting layer and improves the electrical conductivity between the grains and the porous conducting layer.

According to an embodiment of the invention, the step coating the first porous conducting layer with a layer of grains made of a doped semiconducting material comprises depositing an ink comprising the doped grains on a surface of the first porous conducting layer.

According to an embodiment of the invention, the step forming a first porous conducting layer comprises depositing an ink comprising conducting particles on one side of the first porous conducting layer, and the step forming a second porous conducting layer comprises depositing an ink comprising conducting particles onto an opposite side of the porous insulating substrate.

BRIEF DESCRIPTION OF THE DRAWINGS

The invention will now be explained more closely by the description of different embodiments of the invention and with reference to the appended figures.

DETAILED DESCRIPTION OF PREFERRED EMBODIMENTS OF THE INVENTION

Figure 1:
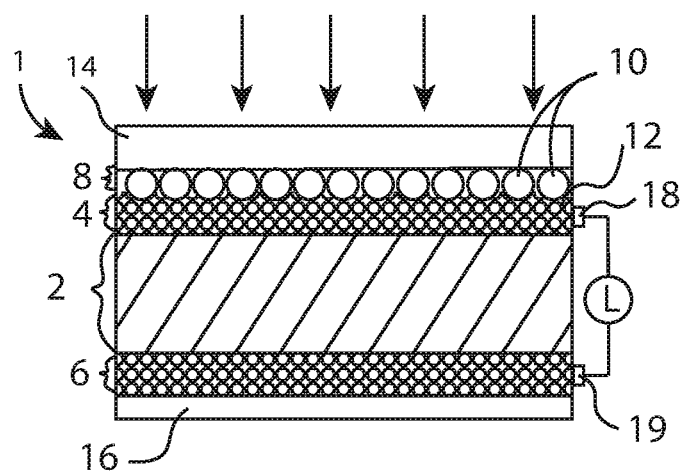
FIG. 1 shows an example of a solar cell according to the invention.

FIG. 1 shows an example of a solar cell 1 according to the invention. The solar cell 1 comprises a porous insulating substrate 2, a first porous conducting layer 4 disposed on one side of the insulating substrate 2, a second conducting layer 6 disposed on the opposite side of the insulating substrate 2, and a light absorbing layer 8 disposed on the first conducting layer 4 and in electrical contact with the first conducting layer 4. The light absorbing layer 8 comprises a plurality of grains 10 of a doped semiconducting material. The light absorbing layer 8 is positioned on a top side of the solar cell. The top side should be facing the sun to allow the sunlight to hit the grains 10 and generate photo-exited electrons. The first porous conducting layer 4 serves as a back contact that extracts photo-generated electrons from the light absorbing layer 8. The second conductive layer may comprise a catalyst.

The solar cell further comprises an electrolyte for transferring charges from the light absorbing layer 8 to the second porous conducting layer 6. In this embodiment, the electrolyte is a liquid electrolyte. The liquid electrolyte is, for example, a redox electrolyte capable of transferring charges i.e, electrons or holes to or from the semiconductor grains. The redox electrolyte is also capable of transferring charges to or from the second conducting layer. Examples of electrolytes include the $I^-/I_3^-$ redox couple or ferrocene compound containing electrolytes, however also other electrolytes can be used. The porosity of the insulating substrate 2 will enable ionic transport through the insulating substrate. The porosity of the first and second conducting layers 4, 6 will enable ionic transport through the conducing layers. For example, the substrate with the applied layers is immersed in a liquid electrolyte and encapsulated. The liquid electrolyte is filled in the pores of the first and second porous conducting layers 4, 6, in pores of the porous insulating substrate 2, and in the space between the grains 10 in the light absorbing layer 6. The solar cell also comprises a casing or other means for enclosing the solar cell and prevent leakage of the electrolyte. The first and second conducting layers 4, 6 are separated physically and electrically by the insulating substrate 2 and therefore the conducting layers 4, 6 are not in direct physical or electrical contact. However, the conducting layers 4, 6 are electrically connected via electrolyte ions penetrating the porous insulating substrate.

Preferably, the grains are made of doped silicon. Silicon has several advantages, for example, it is cheap, chemically stable, and provides a high efficiency due to its high ability to absorb light. Preferably, the grains are made of mono-doped silicon, such as P-doped silicon or N-doped silicon. Doping is a technique used to vary the number of electrons and holes in semiconductors. N-type of doping increases the conductivity of a semiconductor by increasing the number of available electrons. P-type of doping increases the conductivity by increasing the number of holes. Suitably, the porous insulating substrate is a microfiber-based substrate, such as a glass microfiber or a ceramic microfiber. For example, the porous substrate is based on a glass textile combined with glass paper. This makes it possible to provide a thin and strong substrate. The materials forming the porous conducting layers 4, 6 must have a suitable corrosion resistance as to withstand the electrolyte. Suitably, the porous conducting layers are made of titanium, or titanium alloys, or mixtures thereof. Most preferably, the porous conducting layers are made of titanium or a titanium alloy or mixtures thereof. The porous conducting layers 4, 6 are, for example, formed by deposition of a deposit comprising metal hydride particles onto the porous insulating substrate 2, and treating the deposit, so that the solid metal hydride particles transform into metal, and the metal particles are sinter to form a porous conducting layer. The deposit of metal hydride powder, for example titanium hydride powder, can advantageously be printed onto the porous insulating substrate.

The solar cell 1 also includes a first sheet 14 covering a top side of the solar cell and a second sheet 16 covering a bottom side of the solar cell and acting as liquid barriers for the electrolyte. The first sheet 14 on the top side of the solar cell needs to be transparent to allow light to pass through. The sheets 14, 16 are, for example, made of a polymer material. The first and second conducting layers 4, 6 are provided with contacts 18, 19 for connection to an external circuit. The first and second conducting layers are connected to each other through the external circuit. Thus, an electrical circuit is formed where one type of charge carrier, i.e. electrons or holes, are transported from the first conducting layer 4 to the second conducting 6 layer via the external circuit, and the other type of charge carrier, i.e. electrons or holes, are transported from the first conducting layer 4 to the second conducting layer 6 via electrolyte.

Figure 2:
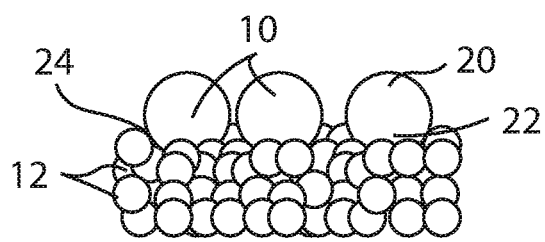
FIG. 2 shows an enlarged part of a light absorbing layer and a first conducting layer of example of a solar cell according to the invention.

FIG. 2 shows an enlarged part of an example of the light absorbing layer 8 and the first porous conducting layer 4. The first porous conducting layer 4 comprises a plurality of conducting particles 12 made of a conducting material. The conductive particles 12 of the first conducting layer are in physical and electrical contact with each other. The grains 10 are in physical and electrical contact with some of the conducting particles 12 of the first conducting layer 4. Most of the grains 10 of the light absorbing layer 8 are protruding into the first conducting layer 4 in order to provide an increased contact surface between the grains 10 and the first conducting layer 4. Most of the grains 10 have an upper portion 20 facing away from the solar cell and a lower portion 22 protruding into the first porous conducting layer. The upper portion 20 of the grains 10 are disposed above the first conducting layer 4 and the lower portion 22 is penetrating into the first conducting layer.

Preferably, the grains 10 have a size less than 100 μm in order to provide a sufficient contact area between the grains and the first conducting layer 4. Preferably, the grains 10 are made of silicon (Si) and the particles 12 are made of titanium (Ti), or at least partly comprises titanium, and the boundaries 24 between the grains 10 and the particles 12 comprises a layer of titanium silicide, which provide good electrical contact between Si and Ti.

Figure 3:
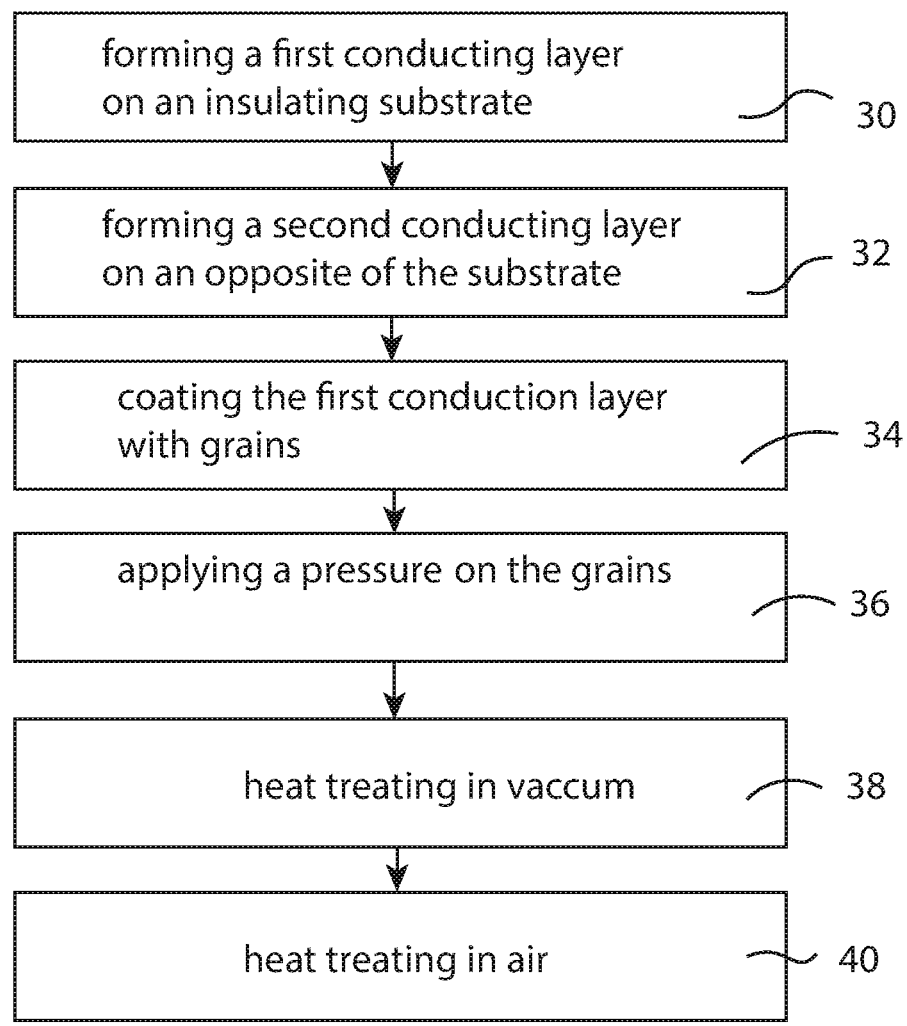
FIG. 3 shows a flow diagram illustrating an example of a method for manufacturing a solar cell according to the invention.

In the following, a method for manufacturing a solar cell according to the invention will be described. FIG. 3 shows a flow diagram illustrating an example of a method for manufacturing a solar cell according to the invention.

Step 1: Forming a first porous conducting layer on one side of a porous insulating substrate, block 30. This is, for example, done by printing with an ink including conductive particles on one side of the porous insulating substrate. The porous insulating substrate is, for example, a porous glass microfiber based substrate.

For example, a first ink is prepared by mixing $TiH_2$ with terpineol. The ink is then bead milled for 25 minutes at 6000 RPM using 0.3 mm zirconia beads. The zirconia beads are separated from the ink by filtration. The ink comprises $TiH_2$ particles with a diameter that is smaller than 2 micrometer. Subsequently, the first ink is printed onto a 15 μm thick, porous glass microfiber based substrate. The second ink is then dried at 200° C. for 5 minutes. The printed layer will form a first porous conducting layer. Suitably, the conductive particles are too large to be able to penetrate through the porous insulating substrate.

Step 2: Forming a second porous conducting layer on an opposite side of the porous insulating substrate, block 32. This is, for example, done by printing with an ink including conductive particles on the opposite side of the porous insulating substrate. Suitably, the conductive particles are too large to be able to penetrate through the porous insulating substrate.

For example, a second ink is prepared by mixing $TiH_2$ with terpineol. The ink is then bead milled for 25 minutes at 6000 RPM using 0.3 mm zirconia beads. The zirconia beads are separated from the ink by filtration. The ink comprises $TiH_2$ particles with a diameter that is smaller than 2 micrometer. The filtered ink is then mixed with platinized conductive particles in order to make an ink for depositing the second conducting layer. Subsequently the second ink is printed onto the opposite side of the porous insulating substrate. The printed substrate is then dried at 200° C. for 5 minutes. The second printed layer will form a first second conducting layer.

Step 3: Coating the first porous conducting layer with a layer of grains made of a doped semiconducting material to form a light absorbing layer, block 34. This is, for example, done by printing with an ink including a powder of grains of a doped semiconducting material, such as doped silicon, onto the first conducting layer. Alternatively, powder of grains of a doped semiconducting material, such as doped silicon, can be sprayed on the first conducting layer. Suitable spraying techniques are electro spraying or electrostatic spraying.

Step 4: Applying a pressure on the layer of grains so that portions of the grains project into the first porous conducting layer, block 36. For example, pressure can be applied on top of the grains by using a membrane press or by using a roller press. Step 4 is optional.

Step 5: Heat treating the solar cell in vacuum until the grains have been sintered to the first porous conducting layer, block 38. The layer of grains and the porous conducting layers are vacuum sintered to form a porous layer of grains on the first conducting layer. During the sintering, the grains bond to the conducting particles of the first conducting layer to achieve mechanical and electrical contact between them. Preferably, the solar cell is heat treated in vacuum with a temperature above 550° C. during at least two hours. For example, the printed substrate is vacuum sintered at 585° C. and then allowed to cool down to room temperature. The pressure during sintering is lower than 0.0001 mbar. During the heat treating in vacuum, the silicon of the grains and the titanium of the particles are reacting and form titanium silicide in the boundaries between the grains and the particles. Thus, layers of titanium silicide are formed between the grains and the particles of the first conducting layer, which improve the electrical contact between the grains and the particles.

Step 6: Heat treating the solar cell in air until the remaining surface of the first porous conducting layer have been oxidized, block 40. In a next step, the solar cell is heat treated in air to achieve an electrically insulating oxide layer on the conducting particles of the first and second conducting layer.

The invention claimed is:

1. A solar cell comprising:
   a porous insulating substrate (2),
   a first porous conducting layer (4) and a second porous conducting layer (6) disposed on opposite sides of the porous insulating substrate (2),
   a light absorbing layer (8) in electrical contact with the first porous conducting layer (4) and disposed on top of said first porous conducting layer (4) opposite said porous insulating substrate (2) to directly face unrestricted incident light, and
   an electrolyte integrally positioned through the first and second porous conductive layers (4, 6), the porous insulating substrate (2) and the light absorbing layer (8) to transfer charge carriers between the second porous conducting layer (6) and the light absorbing layer (8),
   wherein the light absorbing layer (8) comprises a single layer of a plurality of grains (10) composed of doped semiconducting material adapted to generate photo-exited electrons when directly impacted by the unrestricted incident light,
   said grains (10) are arranged in a single layer along the first porous conducting layer (4) with each said grain (10) having an upper portion (20) of doped semiconducting material directly facing the unrestricted incident light and away from said first porous conducting layer (4), and a lower portion (22) of doped semiconducting material in physical and electrical contact with the first porous conducting layer (4), said grains (10) not containing dye adsorbed on surfaces thereof, and
   said electrolyte fills spaces between the grains (10) in said light absorbing layer (8).

2. A solar cell in accordance with claim 1, wherein a number of the grains (10) of doped semiconducting material are in physical and electrical contact with the first conducting layer (4).

3. A solar cell in accordance with claim 1, wherein the grains (10) are made of Si.

4. A solar cell in accordance with claim 1, wherein the first porous conductive layer (4) comprises titanium or a titanium alloy.

5. A solar cell in accordance with claim 1, wherein a zone (24) of physical contact between the grains (10) and the first porous conducting layer (4) consist of titanium silicide.

6. A solar cell in accordance with claim 1, wherein the grains (10) of doped semiconducting material are mono-doped.

7. A solar cell in accordance with claim 1, wherein the grains (10) of the light absorbing layer (8) have the lower portion (22) protruding into the first porous conducting layer (4).

8. A solar cell in accordance with claim 1, wherein the electrolyte is a liquid electrolyte.

9. The solar cell according to claim 1, wherein the first porous conducting layer (4) comprises conductive particles (12) in physical and electrical contact with each other, and the grains (10) are in physical and electrical contact with the conductive particles.

10. The solar cell according to claim 9, wherein at least a part of surfaces of the conductive particles (12) are covered with oxide.

11. The solar cell according to claim 9, wherein at least a part of surfaces of the conductive particles (12) are covered with TiO2.

12. A method for manufacturing the solar cell in accordance with claim 1, comprising:
    forming the first porous conducting layer (4) onto one side of the porous insulating substrate (2),
    forming the second porous conducting layer (6) onto an opposite side of the porous insulating substrate (2),
    coating the first porous concluding layer (4) with the light absorbing layer (8) of the plurality of grains (10) made of the doped semiconducting material,
    conducting a first heat treatment of the solar cell in a non-oxidizing environment or vacuum to bond the plurality of grains (10) to the first porous conducting layer (4), and
    conducting a second heat treatment of the solar cell in an oxidizing environment to form an oxide surface on the first and second porous conductive layers.

13. The method according to claim 12, wherein the grains (10) are made of doped silicon and the first conducting layer (4) comprises titanium, and the first heat treatment causes formation of titanium silicide in zones (24) of physical contact between the grains and the first conducting layer (4), and the second heat treatment causes formation of TiO2 on the first porous conducting layer (4).

14. A method according to claim 12, wherein the first heat treatment is carried out in a temperature above 550° C. during at least two hours.

15. The method according to claim 12, comprising applying a pressure on the layer (8) of grains (10) so that portions of the grains project into the first porous conducting layer (4).

16. A solar cell in accordance with claim 1, wherein the lower portions (22) of most of said grains (10) protrude into said first porous conducting layer (4).

17. A solar cell in accordance with claim 16, wherein
    the first porous conducting layer (4) is composed of conductive particles (12) in physical and electrical contact with each other, and
    the lower portions (22) of most of said grains (10) protrude between the conductive particles (12) and into said first porous conducting layer (4).

* * * * *